May 23, 1933.  J. G. RAYNIAK  1,910,447
MOWING MACHINE
Filed May 23, 1931
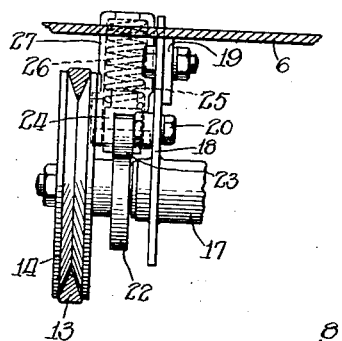
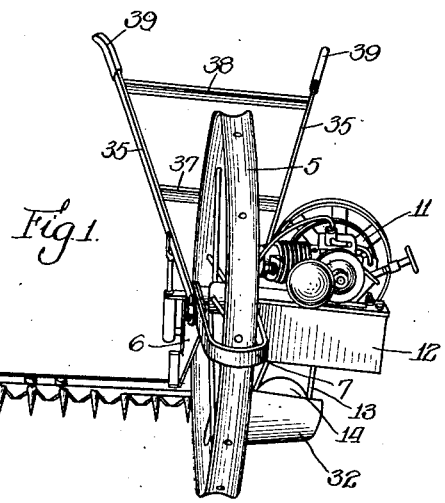
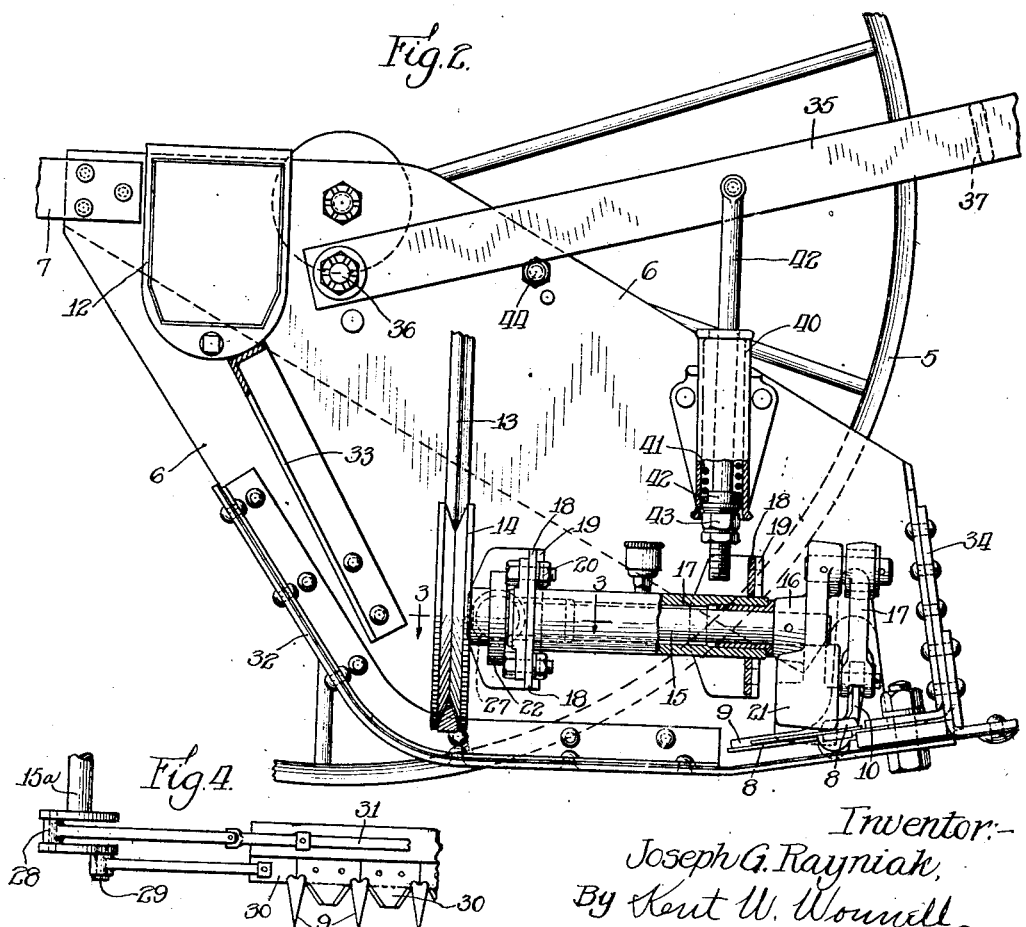
Inventor:-
Joseph G. Rayniak,
By Kent W. Wonnell Atty.

Patented May 23, 1933

1,910,447

UNITED STATES PATENT OFFICE

JOSEPH G. RAYNIAK, OF WAUKEGAN, ILLINOIS, ASSIGNOR, BY MESNE ASSIGNMENTS, TO SILAS E. RAWLS, OF STREATOR, ILLINOIS

MOWING MACHINE

Application filed May 23, 1931. Serial No. 539,567.

This invention relates in general to machines for mowing grass and weeds and more particularly to a hand propelled machine which has a power operated mower.

One of the principal objects of the invention is in the provision of means for counteracting the frame vibration and reducing the shock which is otherwise transmitted to the handles of a machine of this class of this kind when it is operated.

Other objects will appear hereinafter, the accompanying drawing illustrating a preferred embodiment of the invention.

In the drawing Fig. 1 is a perspective of a mowing machine constructed in accordance with the invention. Fig. 2 is a detail side elevation with some of the parts in section; Fig. 3 a section taken on the line 3—3 of the Fig. 2; and Fig. 4 illustrates a modified cutter bar shock absorber.

In a mowing machine of this kind one of the great objections has been that the vibration of the mowing implement which is transmitted to the handles has been so great that it is extremely disagreeable and unpleasant if not actually harmful to an operator. The present invention overcomes the vibration of the mowing implement by means of a shock absorber which counteracts the tendency to vibrate and cushions the shock of reciprocation by reducing it, and also prevents or reduces the transmission of vibration to the handle by resiliently connecting the handle to the frame so that the frame is in effect suspended from the handle, and by providing a resilient grip or grips for the handle itself.

Referring now more particularly to the drawing the machine comprises a single tractor wheel 5 mounted in a frame 6 which extends about the rear and on both sides of the wheel with a connecting yoke 7 extending about the front of the wheel.

A mowing implement comprising a cutter bar 8 with guard fingers 9 is supported by the frame 6. At one side of the wheel there is a reciprocating knife 10 of the conventional power sickle type movable therein.

At the other side of the tractor wheel is a power plant 11 comprising an internal combustion engine which is mounted upon a casing 12 formed as an extension of the frame 6 and constituting a fuel chamber for the engine 11. The engine driver is connected by a belt 13 to a driving pulley 14 mounted upon a shaft 15 which has a crank 16 secured thereto and connected by an arm 17 with the mowing implement reciprocating knife 10.

The shaft 15 is mounted in a bearing 17 having plates 18 at the ends which are adjustably secured to brackets 19 bent outwardly from the frame 6, by means of fastening bolts and nuts 20 and slots in one or both of the parts 18 and 19 for raising and lowering the bearings 17 thereby providing means for adjusting the tension of the belt 13.

In order to counteract or reduce the shock due to the reciprocation of knife 10 the crank 16 is provided with counter-balancing weight 21 and also a cam 22 is mounted upon shaft 15 and is adapted to engage an anti-friction roller 23 carried by a head 24 and having a stem 25 extending within a coiled spring 26 carried by a casing 27 and supported by the frame 6. The tendency to vibrate may also be counterbalanced by providing a driving shaft 15ª with two opposite cranks 28 and 29 as indicated in Fig. 4 one of the cranks being connected to the reciprocating knife member 30 and the other an oppositely movable member 31 and of substantially the same weight.

By the use of these shock absorbers, the tendency to vibrate is counteracted and cushioned and there is less strain upon the parts and less vibration of the frame. The frame may be made of lighter material without danger of breakage and the entire mechanism is less in weight and therefore is more easily propelled and manipulated.

A guard plate 32 is secured to the frame 5 below the power plant 11 to protect the driving pulley 14, the shaft 15 and the associated parts and the frame is provided with a brace 33 and a plate 34 at the front and rear so that the frame will have the necessary strength and rigidity.

The handle preferably comprises two side bars 35 each connected to the frame at one side of the wheel by a pivot 36 and connected together at a distance beyond the wheel by cross braces 37 and 38. At the outer ends the side bars are preferably provided with hand grips 39 of rubber or other shock absorbing material. In order to further cushion the vibration, each handle bar 35 is resiliently connected to the frame by a suspension mounting comprising a tubular casing 40 secured to the frame having a coil spring 41 contained therein and a bar 42 pivoted at its upper end to the handle bar 35 and extending through the spring 41 having a head 42 engaging the spring 41, the other end of the spring being engaged by the upper end of the tubular casing 40. A nut 43 is adjustable at the end of the bar 42 for varying the tension of the spring 41 so that when the handles are raised the mowing machine frame is suspended flexibly by means of this resilient connection. In order to limit the downward movement of the handle bars 35 a stop 44 is secured to the frame at each side of the wheel.

With this construction, it is obvious that the vibration caused by the mowing implement is counteracted and the shock imparted to the frame is cushioned and reduced; the vibration of the motor imparted to the driving shaft is also taken up and reduced; the frame is resiliently supported by the handle so that no vibration is imparted thereto; and the resilient grips 39 further cushion and reduce the shock of vibration.

I claim:

1. A mowing machine having a vibrating cutter, and means comprising a rotary cam operated with the cutter and a spring fixed to the machine and engaged by the cam to reduce the shock caused by the movement of the cutter.

2. A mowing machine having handles and a cutter which causes vibration due to its movement, and means to cushion the vibration of the handles due to the cutter movement.

3. A mowing machine having supporting handles, a movable cutter, and a shock absorbing handle mounting to reduce the vibration imparted thereto by the cutter.

4. A mowing machine having a frame, a movable cutter, a handle connected to the frame, and a yielding connection between the handle and the frame.

5. A mowing machine having a wheeled frame, a handle connected thereto, and resilient means also connecting the handle and frame for reducing the handle vibration.

6. A mowing machine having a wheeled frame, a handle pivoted at one end thereto, and shock absorbing means between the handle and frame.

7. A mowing machine having a traction wheel and a frame on both sides thereof, a handle having ends pivoted in the frame at both sides of the wheel, and resilient suspension means between the handle and each side of the frame.

8. In a mowing machine, a frame, a handle therefor, and means forming a resilient suspension for the frame from the handle.

9. A mowing machine having a frame and a handle therefor, and a resilient connection between the frame and handle comprising a spring and a holder therefor attached to one of the parts, and a rod attached to the other part and engaging the spring to reduce any shock between the frame and handle.

10. A mowing machine having a frame, a handle therefor, and a suspension shock absorber comprising a shell attached to the frame, an extended spring therein, a rod extending through the spring and shell having a head at one end engaging the spring and its other end pivoted to the handle.

11. A mowing machine having a frame and a movable cutter, rotary means for moving the cutter, and means on the frame comprising a spring engaging the rotary means for absorbing the vibrations of the cutter due to its movement.

12. A mowing machine having a reciprocable cutter, rotary means for driving the cutter, and resilient means carried by the machine and engaging the rotary driving means for counteracting the vibrations of the cutter.

13. A mowing machine having a reciprocating cutter and a rotatable drive therefor, and shock absorbing means in connection with the drive comprising a spring pressed cam for reducing the vibration due to the movement of the cutter.

14. A mowing machine having a vibration cutter and a rotatable driver therefor, and a shock absorber comprising a cam carried by the driver and a yielding member carried by the machine frame and engaged by the cam to counteract the cutter vibration.

15. A mower having a movable frame and a supporting handle therefor; a cutter reciprocable transversely of the frame; and shock absorbing means off the cutter, the frame, and the handle to cushion the vibration of the handle in operating the mower.

16. A power mower having a wheeled frame and a handle for supporting it, a transversely reciprocable cutter having a rotatable power drive, shock absorbing means for the cutter between the drive and frame, and shock absorbing means between the frame and the handle.

17. A power mower having a motor mounted on a wheeled frame, a handle for yieldingly supporting it, a transversely reciprocable cutter bar having a driving connection with the motor, and means on the frame associated with the driving connection for reducing cutter bar vibration.

18. A hand propelled mowing machine comprising a single traction wheel having a frame at the sides, a mowing implement at one side, a power plant therefore at the other side and counter balancing the implement, a rear handle to control the machine, a shock absorber on the frame for the mowing implement, and a resilient cushion between the handle and the frame.

19. A hand propelled mowing machine having a single traction wheel and a frame extending at the sides thereof, a mowing implement supported at one side, a power plant supported at the other side and counter balancing the implement in the direction of its movement, a rear handle to control the machine means forming a yielding suspension of the frame in the handle, and stop means to limit the yielding movement of the handle with respect to the frame.

20. In a mowing machine, a reciprocating cutter, reciprocating means to counteract the vibration caused by the movement of the cutter, a rotary cutter drive; and means including a cam carried by the rotary drive and a spring fixed to the machine frame and engaging the cam to reduce vibration in the frame caused by the movement of the cutter.

JOSEPH G. RAYNIAK.